US008678200B2

(12) United States Patent
Hodges et al.

(10) Patent No.: US 8,678,200 B2
(45) Date of Patent: Mar. 25, 2014

(54) APPARATUS AND METHOD FOR DE-WATERING OF SLURRIES

(75) Inventors: Michael Kent Hodges, Colorado Springs, CO (US); Larry D. Campbell, Harrah, OK (US)

(73) Assignee: Genesis Fluid Solutions, Ltd, Colorado Springs, CO (US)

( * ) Notice: Subject to any disclaimer, the term of this patent is extended or adjusted under 35 U.S.C. 154(b) by 1230 days.

(21) Appl. No.: 11/676,699

(22) Filed: Feb. 20, 2007

(65) Prior Publication Data

US 2007/0221555 A1   Sep. 27, 2007

Related U.S. Application Data

(60) Provisional application No. 60/826,424, filed on Sep. 21, 2006, provisional application No. 60/884,651, filed on Jan. 12, 2007.

(51) Int. Cl.
| | | |
|---|---|---|
| *B01D 33/72* | (2006.01) | |
| *B01D 33/80* | (2006.01) | |
| *B03D 3/06* | (2006.01) | |
| *B07B 1/28* | (2006.01) | |
| *B65G 53/26* | (2006.01) | |

(52) U.S. Cl.
USPC ........ 210/456; 210/221.2; 210/151; 210/710; 210/768; 210/800; 210/499; 210/806; 210/780; 210/328; 210/330; 210/416.1; 406/46; 406/89; 406/195; 209/5; 209/17; 209/269

(58) Field of Classification Search
USPC ......... 210/705, 768, 767, 800, 456, 499, 703, 210/704, 787, 723, 808, 416.1, 150, 151, 210/221.2, 388, 710, 806, 780, 328, 330; 37/307; 209/5, 17, 274, 281, 310, 405, 209/412, 363, 364, 397–399, 401–403, 209/269; 406/46, 86, 89–91, 195, 47–48
See application file for complete search history.

(56) References Cited

U.S. PATENT DOCUMENTS 1,120,535 A * 12/1914 Pruden .......................... 366/101
2,205,490 A *  6/1940 Peterson ........................ 37/308
(Continued)

FOREIGN PATENT DOCUMENTS

| GB | 2409677 A1 | 7/2005 |
|---|---|---|
| JP | 57085725 A * | 5/1982 |

(Continued)

OTHER PUBLICATIONS

Non Final Office Action received for U.S. Appl. No. 13/673,838, mailed on Aug. 29, 2013, 14 pages.

*Primary Examiner* — David C Mellon
(74) *Attorney, Agent, or Firm* — Morrison & Foerster LLP

(57) ABSTRACT

A system for dewatering a stream of slurry has a first and a second separator. The first separator removes objects above a first size, to produce a stream of primary treated slurry. The second separator removes objects above a second size from the primary treated stream, the second size being smaller than the first size. Optionally, a third separator removes objects above a yet smaller third size from the stream of secondary treated slurry. The first separator has a plurality of sieve mat supports alternately connected to a main support frame section and a movable support frame section so that the flexible sieve mat can be agitated by the movable support frame section, a collector being provided for collecting the primary treated slurry passing through the flexible sieve mat. In an optional step, water contained in the separated solids is removed.

22 Claims, 5 Drawing Sheets

(56) References Cited

U.S. PATENT DOCUMENTS

| | | | |
|---|---|---|---|
| 4,025,121 A * | 5/1977 | Kleysteuber et al. | 406/96 |
| 4,491,442 A * | 1/1985 | Stelter et al. | 406/95 |
| 4,518,286 A | 5/1985 | Vaupel et al. | |
| 4,630,975 A * | 12/1986 | Becker | 406/85 |
| 4,762,148 A | 8/1988 | Marui | |
| 5,062,949 A | 11/1991 | Hausmann | |
| 5,150,990 A * | 9/1992 | Morimoto et al. | 406/50 |
| 5,252,007 A * | 10/1993 | Klinzing et al. | 406/14 |
| 5,614,094 A | 3/1997 | Deister | |
| 5,656,174 A | 8/1997 | Hodges | |
| 5,762,781 A * | 6/1998 | Bodnaras | 209/170 |
| 5,792,363 A | 8/1998 | Rodgers | |
| 5,938,936 A * | 8/1999 | Hodges et al. | 210/705 |
| 6,149,811 A | 11/2000 | Hodges | |
| 6,652,757 B2 | 11/2003 | Hodges | |
| 2003/0230541 A1 | 12/2003 | Derrick | |
| 2005/0183574 A1 | 8/2005 | Burnett et al. | |
| 2005/0274652 A1 | 12/2005 | LaVeine | |
| 2005/0274653 A1 | 12/2005 | LaVeine | |
| 2006/0102390 A1 * | 5/2006 | Burnett et al. | 175/66 |
| 2010/0176064 A1 * | 7/2010 | Batty et al. | 210/737 |

FOREIGN PATENT DOCUMENTS

| | | |
|---|---|---|
| WO | 98/16328 A1 | 4/1998 |
| WO | 01/85628 | 11/2001 |

\* cited by examiner

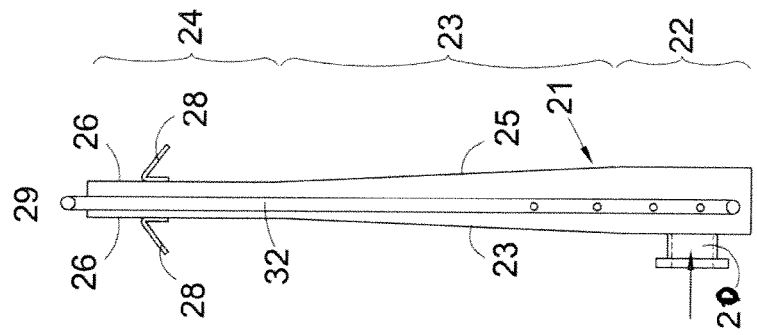
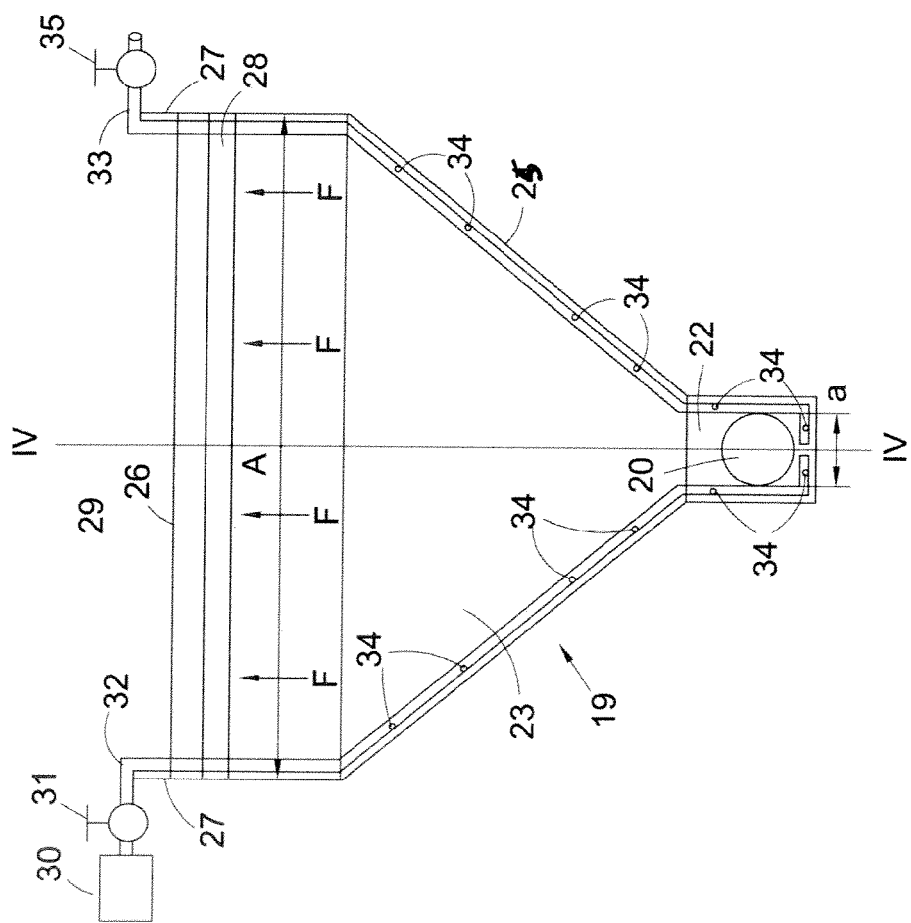

APPARATUS AND METHOD FOR DE-WATERING OF SLURRIES

CROSS-REFERENCE TO RELATED APPLICATIONS

This is a non-provisional application of U.S. provisional applications 60/826,424, filed 21 Sep. 2006, and 60/884,651, filed 12 Jan. 2007, both of which are incorporated as if fully recited herein. A claim of priority is made to Great Britain application 0603246.0, filed 17 Feb. 2006, and to a PCT application PCT/GB2007/000544, filed 16 Feb. 2007, both of which are also incorporated by reference as if fully recited herein.

TECHNICAL FIELD

The present invention relates to improvements in techniques for dewatering of slurries, particularly slurries resulting from "dredge spoils".

BACKGROUND OF THE ART

Dredge spoil disposal presents a significant problem for dredging contractors. The dredged sludge is suspended in water in the form of a slurry. Such slurries may create serious recovery problems if discharged directly into holding lagoons or settling basins. Accordingly, there is a need to efficiently dewater and reclaim the solid materials from these slurries. This invention provides a quick and efficient means for the separation of water from solids, thereby economically reducing volumes and thereby introducing an attractive option for sediment recovery, re-use, or disposal.

Hydraulic dredges are effective excavation devices for removal of a wide variety of sediments from natural or man-made waterways. The dredges may remove sediments which are classified as contaminated or hazardous sediments as well as non-hazardous sediments. The sediments may comprise debris such as sand, gravel, clays, silts, organic matter, or any combination thereof. Typically, the finest fraction of solids, including clays, silts, and organic matter, contributes the greatest volume and this fraction is also the most difficult to recover. All of the materials excavated from a waterway in the hydraulic dredging process must be removed to a disposal site. Traditionally, these sites include settling basins specifically engineered to accommodate the slow settling characteristics of the finest of the particulate matter. These "sludge lagoons" burden the immediate community in various ways. They occupy significant areas of land and are generally unpleasant neighbors because of the noxious odors emitted during the slow process of drying out the hydrated sediments.

In an attempt to solve the problems associated with such traditional settling basins, dredge slurry dewatering systems were introduced. These dewatering systems are used to separate dredge solids from water so that the solids may be recycled or disposed. The systems typically comprise screening assemblies, hydrocyclones, centrifuges, belt presses and clarifying vessels. Most of these systems operate as "batch treatment" processes, which can accept only defined quantities of dredge spoil at spaced intervals. The dredge spoil is first pumped into a holding vessel, then, while the dredge sits idle, the slurry is slowly pumped and treated by each apparatus in turn, until the holding vessel can be refilled. The processing rates of the individual equipment components of the dewatering system thus limit the throughput rate of the dredging operation. The inefficiencies associated with such batch systems serve to raise the costs of operation.

Continuous de-watering systems have been proposed by the inventor. In general, such systems may be described as developments of a generic slurry dewatering system and can be seen to provide apparatus for de-watering a stream of slurry comprising a first separator, for separating objects above a first size from a stream of slurry, to produce a stream of primary treated slurry, a second separator for receiving the stream of primary treated slurry and for separating objects above a second size from the stream of primary treated slurry to produce a stream of secondary treated slurry, the second size being smaller than the first size and a third separator for receiving the stream of secondary treated slurry and for separating objects above a third size from the stream of secondary treated slurry, the third size being smaller than the first and second sizes.

Further levels of treatment may be provided, for example further removal of solids from the treated water or further dewatering of the solids removed by earlier stages from the stream of slurry.

U.S. Pat. No. 5,656,174 ("Hodges '174"), issued on 12 Aug. 1997 to one of the inventors herein, describes a dewatering system that is capable of continuous operation. The system employs a first separator in the form of a series of filtration screens, and optionally a second separator such as a hydrocyclone, followed by addition of a flocculating agent to aggregate the fine solids. The flocculated material is then filtered by passage over a third separator in the form of a tracking screen assembly having two screens supported on an A-shaped frame. Optionally, the treated water is centrifuged to remove further solids.

U.S. Pat. No. 6,149,811 ("Hodges '811"), issued 21 Nov. 2000 to one of the inventors herein, discloses a screen device for collecting solids in a slurry feed stream, comprising a plurality of screens connected together at various angles. It can be used as the third separator A PCT application WO01/85628 A1 ("Hodges PCT '628"), published 15 Nov. 2001, provides a sludge de-watering system that is capable of delivering high flow rates and which is easy operate. A patent family member of this application issued on 25 Nov. 2003 in the United States as U.S. Pat. No. 6,652,757 ("Hodges '757") to one of the inventors herein. It may be applied particularly in the final stage of the process described in Hodges '174. A stream of slurry is de-watered by continuously determining one or more parameters, adding a flocculating agent to the stream of slurry in response to the determined parameters, mixing the flocculating agent with the slurry to afford a stream of flocculated slurry, delivering the flocculated slurry through a diffuser onto a tracking screen and filtering the flocculated slurry through the tracking screen to provide solids and a filtrate. The parameters are the flow rate of the slurry, the pulp density of the slurry and the pulp density of the filtrate. The tracking screen suitably provides a third separator for use in the apparatus of Hodges '174.

Hodges PCT '628 particularly discloses a diffuser which is designed to deliver of stream of flocculated slurry to a tracking screen, the diffuser comprising a vertically disposed conduit rising from a base having the inlet for the stream of flocculated slurry to an upper portion where the stream of flocculated slurry is delivered to the tracking screen, said conduit having a horizontal sectional area that remains constant or increases from the base to the upper portion and an aspect ratio that substantially increases from the base to the upper portion.

Hodges PCT '628 further discloses that the flocculated slurry removed by the tracking screen may further be dewatered by use of a solids belt press.

SUMMARY OF THE INVENTION

The inventor has continued to seek improvements to each separator stage of generic slurry dewatering systems, to improve the operation of the apparatus.

It has been found that the flow from the portable hydraulic dredge often carries with it various types of debris. This debris may include any or all of shells, rocks, plastic shopping bags, metal pieces from shopping carts or sunken boats, batteries, wood chips and wood fibre, pieces of wire and fishing line, underwater vegetation, skeletal remains of many organisms, delaminated carpet and artificial grass. In existing systems, two types of equipment (frequently working together) have been used to attempt to remove debris from the dredge flow. The first part of the two-part system comprises a coarse-screening unit, usually constructed of heavy metal bars of grid or parallel design. The flow from the dredges is generally pumped over this grid at an angle in order to promote a level of self-cleaning. This heavy metal design is necessary because rocks and shells and other heavy debris would otherwise block the screens. The heavy metal screening unit is typically followed by a finer, more delicate screen, for example a vibrating screen.

However, it has been found that when underwater vegetation or carpet fibre is present, both the coarse screen and the vibratory screen quickly become obstructed, with the surface area of both screens clogged with fibrous material or vegetation. This type of obstruction is called blinding in the business and is a significant problem. In some cases, the flow from the dredge must be stopped periodically to clean the screen. In some case, the cleaning of the screens can occur several times a minute.

An object of the present invention is to provide a first separator for use in an apparatus for de-watering a stream of slurry which avoids the problems of the prior art.

A further object of the present invention is to provide a first separator for apparatus for dewatering a stream of slurry, in which the problem of blinding can be reduced.

The inventor has realised that a separator which comprises a plurality of sieve mats which are energised in use so that they have a "snapping" motion is extremely successful in removing debris and has a high resistance to blinding.

Such separators are known in the field of dry separation of materials, in particular, when removing fine material from a substrate. However, they have not been employed in the screening of slurry. Such separators have to be modified for use in the screening of slurry by the inclusion of a collector located below the flexible sieve mat for collecting slurry passing through the sieve mat.

Accordingly, in a first aspect, the present invention provides apparatus for de-watering a stream of slurry, comprising:

a first separator for separating objects above a first size from a stream of slurry, to produce a stream of primary treated slurry; and a second separator, for receiving the stream of primary treated slurry and for separating objects above a second size from the stream of primary treated slurry, to produce a stream of secondary treated slurry, the second size being smaller than the first size;

wherein the first separator comprises:

a frame assembly comprised of a main support frame section and a movable support frame section movably mounted on the main support frame section;

a plurality of sieve mat supports spaced transversely along the length of the frame assembly;

a flexible sieve mat extending along the length of the frame assembly and connected to and supported by the sieve mat supports, the sieve mat supports being alternately connected to the main support frame section and the movable support frame section, and a collector located below the flexible sieve mat for connecting primary treated slurry passing through the flexible sieve mat.

The first aspect of the present invention further provides a method of de-watering a stream of slurry, comprising:

feeding a stream of slurry to a first separator to separate objects above a first size from the stream of slurry to produce a stream of primary treated slurry, and feeding the primary treated slurry to a second separator for separating objects above a second size from the stream of primary treated slurry, to produce a stream of secondary treated slurry, the second size being smaller than the first size, wherein the first separator comprises a frame assembly comprised of a main support frame section and a movable support frame section movably mounted on the main support frame section;

a plurality of sieve mat supports spaced transversely along the length of the frame assembly;

a flexible sieve mat extending along the length of the frame assembly and connected to and supported by the sieve mat supports, the sieve mat supports being alternately connected to the main support frame section and the movable support frame section, the movable support frame section being agitated, continuously to impart motion to parts of the flexible sieve mat connected to the movable support frame section, treated slurry passing through the flexible sieve mat being collected in a collector located below the flexible sieve mat.

Hodges PCT '628 shows a diffuser which is generally fan shaped and which, in front elevation, rises from a relatively narrow base via a substantially triangular middle portion to a relatively wide upper portion. In side elevation, it tapers from a base to a narrower upper portion.

The diffuser is used, because it allows the delivery of an evenly distributed stream of flocculated slurry to a tracking screen. Without such a diffuser, clogging of the stream of flocculated slurry before delivery to the tracking screen can occur and uneven delivery of the flocculated slurry to the tracking screen.

Even distribution of the flocculated slurry over the surface of the tracking screen is highly important for a satisfactory operation of the sludge de-watering system. However, it has been found in practice that an even distribution of flocculated slurry will sometimes not be obtained. Without wishing to be bound by theory, it is believed that this is due to the non-Newtonian nature of the flocculated slurry. In particular, under certain conditions, flocculated slurry starts to precipitate within the diffuser, preventing an even distribution. This has been found to be particularly to be the case when the density of the flocculated substrate is too high to be entrained by the water flowing through the diffuser. This may be caused, for example, by heavy specific gravity sediments or where a large proportion by mass of sediment is entrained in the slurry.

Aggravating this problem is the fact that the flow rate of the water within the diffuser cannot be altered at will, because other parts of the process have critical mass balance conditions. For example, the tracking screen may only be able to cope with a certain maximum volume of flowing water. Too much material can lead to blinding of the screens causing spills. Although an optimum geometry of diffuser can be obtained for any specific type of sediment and flow rate of sediment, it is desired to be able to treat slurries from a wide variety of environments.

Accordingly, a further object of the present invention is to provide a duct for use in an apparatus for separating suspended solid from water which avoids the problems of the prior art.

A further object of the present invention is to provide a duct for use in an apparatus for separating suspended solid from water, in which the problem of uneven distribution of water having suspended solid at the outlet of the duct can be avoided.

The present inventors have realised that the flow rate of water having solid suspended therein within a duct can be freely controlled by feeding a gas into the water, which increases its flow volume.

A duct of this type is applicable to any apparatus for separating suspended solid from water, but it is particularly suitable for feeding a slurry in an apparatus or method for de-watering the slurry using a flocculating agent.

In the second aspect, the present invention accordingly provides a duct for use in an apparatus for separating suspended solid from water, said duct comprising:

an inlet portion for receiving a flow of water having solid suspended therein, the inlet portion defining an inlet flow direction and having an inlet maximum width in a direction normal to the inlet flow direction, an outlet portion for delivering a flow of water having the solid suspended therein, the outlet portion defining an outlet flow direction and having an outlet maximum width in a direction normal to the outlet flow direction, the outlet maximum width being greater than inlet maximum width, and a duct section connecting the inlet portion and the outlet portion, at least one gas feed being provided within the inlet portion or duct section, for allowing gas to be fed into the flow of water having solid suspended therein.

The second aspect of the present invention further provides a method of feeding water having a solid suspended therein, for use in a method for separating the solid from the water, the method comprising feeding water having solid suspended therein into a duct, said duct comprising an inlet portion, the inlet portion defining an inlet flow direction and having an inlet maximum width in the direction normal to the inlet flow direction, an outlet portion for delivering the flow of water having solid suspended therein, the outlet portion defining an outlet flow direction and having an outlet maximum width in a direction normal to the outlet flow direction, the outlet maximum width being greater than the inlet maximum width, and a duct section connecting the inlet portion and the outlet portion, wherein a gas is fed into the flow of water having solid suspended therein in the inlet portion or duct section.

By feeding gas into the liquid flow, the volume of the flow comprising water and gas mixed together can be very readily controlled. Further, the presence of gas bubbles tends to prevent precipitation of flocculated solid in the water. The gas is very easy to remove from the water, as the bubbles simply rise and separate from the water.

As noted above, WO01/85628 indicates that the separated flocculated solids can be dewatered, that is, subjected to a further dewatering operation to remove capillary water. The flocculated solids separated by the tracking screen disclosed in WO01/85628 may have moisture content in the range of 20-40% by weight. This moisture content is typically held in small spaces between flocculated particles, from which it is difficult to remove by gravity drainage. This is referred to as capillary water. In the past, such capillary water has been removed by squeezing or pressing using belts presses. However, problems have been encountered with such belt presses due to down-time issues. The large belts can and will stretch and split over time and they need replacement. The hydraulics and electrical systems are sensitive and vulnerable to bad weather conditions or power surges. The belt presses employ many moving parts which are subject to breakdown. When multiple presses are used, the complicating issues are multiplied, creating significant problems of down-time.

Accordingly, a further object of the present invention is to provide a method and apparatus for removing water from filtered solids, which are simpler, more cost effective, and easier to operate in steady state conditions.

The present inventor has realised that the filtered solids (or filter cake) obtained from tracking screens can be spread out on a filtration membrane and then exposed to dewatering by reducing pressure below the filter membrane. Because the cake forms an effective seal, very efficient dewatering can be obtained if a suitable membrane is used.

Accordingly, in a third aspect of the present invention, there is provided an apparatus for removing water from solids which have been separated from a slurry, the apparatus comprising:

a vessel, having a first section and a second section, the first section and second section being separated by a filter screen, the filter screen being configured to allow water to pass through and to retain solids, the first section being for receiving solids which have been separated from slurry and the second section being connected to a pump assembly, the pump assembly being for removing water from the second section and for reducing the pressure in the second section relative to the first section.

The present invention further provides a method of removing water from solids which have been separated from a slurry, comprising the steps of:

providing a vessel having a first section and a second section, the first section and the second section being separated by a filter screen, the filter screen being configure to allow water to pass through but to retain solids, feeding solids which have been removed from the slurry into the first section, to form a layer on the filter screen, using a pump assembly to reduce the pressure in the second section relative to the first section and to remove water from the second section, so that water is removed from the layer of solids.

DETAILED DESCRIPTION OF THE INVENTION

Preferred and optional features of the present invention will be further described below.

The method and apparatus of the first aspect of the invention may be used in the first separation step of the generic slurry dewatering system. The method and apparatus of the second aspect of the invention can be used in the third separation step of the generic slurry dewatering system. The method and apparatus of the third aspect of the invention can be used in the further levels of treatment of the generic slurry dewatering system.

The apparatus of the first, second or third aspect of the invention can be used in the method of Hodges '174.

The apparatus and method of Hodges PCT '628 can be used in the apparatus of the first aspect of the invention in an optional third separation step.

The screen and device of Hodges '811 can be used in the method and apparatus according to the first aspect of the present invention, in the third separation step.

Preferably, the apparatus for de-watering a stream of slurry of the first aspect of the invention further comprises a third separator for receiving the stream of secondary treated slurry and for separating objects above a third size from the stream of secondary treated slurry, the third size being smaller than the first and second sizes. Preferably, in the method of the first aspect of the invention, there is a further stage of feeding the stream of secondary treated slurry to a third separator, for separating objects above a third size from the stream of secondary treated slurry, the third size being smaller than the first and second sizes.

In the first separator of the first aspect of the invention, the main support frame section is preferably mounted on a base.

Preferably, there is an eccentric drive mechanism connected to the main frame support for applying a drive force thereto. Preferably, it is a periodic drive, for example an oscillating drive. It may comprise a rotatably mounted eccentric weight.

It is found that the design of first separator of the first aspect of the invention allows the flexible sieve mat to be moved by the movable support frame section continuously to dislodge material collected on the flexible sieve mat.

It is particularly preferred that the sieve mat should be designed so that it can execute a "flipping" or snapping" movement. That is, it is preferably designed so that, when being moved by the movable support frame section, the respective part of the sieve mat moves very quickly from a first position to a second position. Preferably, it moves more quickly than it would if it were executing a simple harmonic motion. This is found to give particularly effective dislodging of collected materials. This motion can be obtained if the flexible sieve mat comprises upwardly curved lateral sides. The curved sides resist initial motion away from their rest position until sufficient force is applied, whereupon they rapidly deflect into an upwardly curved configuration.

Preferably, the sieve mat comprises upwardly curved lateral sides forming a non-vertical, gradually curved shape. Suitably, the gradually curved shape has a maximum rise to run ratio y/x of about 1.0.

Preferably, the upwardly curved lateral size of the sieve mat includes perforations for screening material.

Preferably, the sieve mat is disposed at a declined orientation. In this way, material collected on the sieve mat will be fed in the downward direction so that it can be removed and collected. Suitably, the sieve mat is disposed at a declination angle of between 5° degrees and 30° degrees to the horizontal.

Preferably, the declination angle is substantially constant over the length of the sieve mat. However, it is also possible that the declination angle may vary over the length of the sieve mat, decreasing from an inlet end to an outlet end.

The frame assembly, sieve mat supports and sieve mat of the first aspect of the invention may be as described in the PCT publication WO2005/123278 A2 of 29 Dec. 2005 or one of two US published applications US2005/0274652 and US2005/0274653, all of which are owned by Action Equipment Company, Inc. of Newberg, Oreg. However, it is necessary to modify this apparatus to incorporate a collector.

The collector may comprise a tank. Preferably, the collector extends for the whole length of the flexible sieve mat, so that all of the primary treated slurry passing through the flexible sieve mat may be collected.

In all aspects of the invention, there are preferably feeders such as pumps for feeding treated slurry at each step. For example, there may be a first pump for pumping primary treated slurry from the collector to the second separator. There may be a second pump for feeding secondary treated slurry from the second separator to the third separator.

The second separator of a generic slurry dewatering system may comprise a filter screen or a cyclone bank. However, it is particularly preferred that it comprises a sand separator.

A suitable design of sand separator can be obtained from the company McLanahan.

This separator comprises a hydrocyclone. It comprises an inlet for primary treated slurry at a first radius, the separator comprising a tank, the internal diameter of which decreases in a downward direction. Primary treated slurry is fed in tangentially at a first radius at the top of the separator. This gives it a circulating motion. As the slurry descends through the separator, the circulating motion is accelerated by the decreasing radius. A collector, commonly called a vortex finder, is provided in the centre of the cyclone for collecting secondary treated slurry.

As the circulation speed of the slurry increases, suspended sand moves radially outward by centrifugal effect and settles in the bottom of the cyclone.

The separator is provided with an air valve at the top connected to a vacuum source such as a pump. The valve is operable to control the rate of extraction of air and the pressure difference between the inside of the separator and atmosphere.

At the base of cyclone there is a valve. The valve may be formed of rubber. The valve is preferably weight activated. The valve is biased into a closed position. The valve is openable by the weight of sand acting on the valve. The valve is further biased into a closed position by a pressure differential existing between the inside of the separator and atmosphere. In use, the pressure differential between atmosphere and the inside of the separator is used to enhance de-watering of the precipitated sand, so that the sand discharged can be relatively dry. Discharge is effected by raising the pressure in the separator so that the weight of sand is sufficient to overcome the biasing force of the lower valve.

The third separator of a generic slurry dewatering system may comprise a duct according to the second aspect of the invention. The duct of the second aspect of the present invention is particularly suitable for use as a diffuser in the apparatus described in Hodges PCT '628. It is particularly useful as a duct for slurry or water having sediment suspended therein.

It is suitable for use in an apparatus for dewatering of slurry. Other features of the apparatus may be as described in Hodges PCT '628.

An apparatus for dewatering slurry may have a plurality of ducts according to the present invention, each having its associated dewatering apparatus. Preferably there are at least four ducts according to the present invention. They may be configured in any arrangement with respect to one another. Preferably, the ducts of the invention are arranged in a line.

The duct may have the same shape as described for the diffuser in Hodges PCT '628.

The duct may also be called a diffuser.

The duct preferably has a base and an upper portion. Preferably, the base has a horizontal section of relatively low aspect of ratio, for example of 1:1 to 4:1. Said upper portion preferably has a horizontal section with a relatively high aspect ratio, for example from 40:1 to 100:1, the ratio of the horizontal section area of the upper portion and the base preferably being from 1:1 to 3:1. Preferably, the duct is generally fan shaped and, in a front elevation, rises from a relatively narrow base, via a substantially triangular middle portion, to a relatively wide upper portion and in a side elevation, tapers from a base to narrower upper portion. Preferably, the base and the upper portion, in both front elevation and side elevation, are substantially rectangular.

At the outlet portion and the inlet portion, the inlet maximum width and outlet maximum width is determined in each case by considering a plane which is normal to the flow direction and by determining the maximum width in that plane.

The inlet portion preferably comprises a connection for connecting to a supply of water having solid suspended therein. The supply may comprise a conventional pipe or duct. The supply may be in turn connected to a pump.

The inlet portion of the duct of the present invention may comprise connections which are connectable to two or more supplies of water having solids suspended therein. Preferably, such connections are displaced from one another. In this way, streams of water from the respective connections flow past one another, generating a vortex, which has the effect of increasing the time that the flocculating agent has to act on the water, without introducing excessive shear.

The duct of the present invention is preferably configured so that the inlet portion is below the outlet portion in the vertical direction. Preferably, the duct section is configured so that the flow direction through the duct section from the inlet portion to the outlet portion is substantially vertical.

This has particular advantages according to the invention in that the gas rises with the flowing fluid in the duct to the outlet portion where it can be readily separated from the water.

The outlet portion is suitably configured as an opening having at least one linear edge, over which water may flow. In use, the linear edge is preferably oriented substantially horizontally so that an even flow over the linear edge along its whole length can be obtained. The outlet portion is preferably substantially open at the top, so that the gas can exit freely.

The duct of the present invention may comprise at least two duct portions in sequence which together form a single duct. The duct portions may have different shapes. For example, the first duct portion may comprise a section of pipe or conduit and the second duct portion may comprise a geometric shape which provides an increase in width in a direction normal to the direction of flow. Gas feed may be in either or both duct portions. The first duct portion may be of substantially constant width normal to the direction of the flow.

The duct preferably comprises flanges disposed parallel to and slightly below the linear edge and extending downwardly at an angle from 30° to 60° to horizontal. It is preferred that this angle should match the angle of a frame tracking screen with which the duct is to be used. Preferably, the angle is from 40-55°, preferably 45 to 50° to the horizontal.

The gas feed may be inserted from at least one of:

a gas conduit having at least one gas feed aperture, the gas conduit extending along at least part of the duct section or inlet portion, a gas feed aperture formed in a wall of the duct section or inlet portion, a gas feed aperture formed in a conduit extending through a wall of the duct section or inlet portion.

The gas feed may be positioned at any suitable location. Preferably there are a plurality of gas feeds at different positions in the duct section. The gas feed may be located in a central region of the duct section or adjacent the wall of the duct section. The gas feed may be located at any suitable position between the inlet portion and the outlet portion.

Preferably, there are at least four gas feeds and more preferably at least six gas feeds at different positions in the duct section.

Where the duct section has a cross sectional shape normal to the flow direction which has a generally rectangular form with shorter sides and longer sides, the gas feed is preferably arranged adjacent at least one and preferably adjacent both of the shorter sides.

Where the duct comprises a fan shape having at least two opposed diverging wall sections, the gas feed preferably comprises a plurality of gas feed apertures located along or adjacent the diverging wall sections. This has the advantage that gas feed can be spread over a wide range of width normal to the flow direction, thus ensuring that even flow speed can be obtained across substantially the whole width of the flow.

It is particularly preferred that the gas feed comprises at least one and preferably two gas feed conduits extending from the inlet portion to the outlet portion and having a plurality of gas feed apertures. Preferably, the duct has a fan shape and the at least one gas feed conduit is preferably placed adjacent at least one diverging wall of a fan shaped duct.

The gas feed preferably comprises a gas feed source. This should comprise a source of gas at a pressure above the hydrostatic pressure within the duct. For example, the gas may be fed from a gas reservoir or from a pump.

The gas may comprise any suitable gas, being most conveniently air.

Preferably, an air pump is used.

Where there are two or more ducts according to the present invention, each may comprise a separate source of gas or a single source of gas may supply some or all of the ducts.

Where a gas conduit is used, the diameter will depend upon the flow rate of gas, but it is typically around 12.7 mm (0.5 inches) in diameter.

A gas feed control may be provided to ensure that the gas is supplied at a controlled rate. The control may comprise means for controlling the rate of operation of the pump, a valve or a combination of the two.

Where there are plurality of gas feed apertures at different positions within the duct section and where the duct section is configured so that the inlet portion is below the outlet portion, it is preferred that the apertures which are lower have a larger aperture size so that the gas feed rate is substantially the same at different heights within the duct section. If the apertures were of the same shape, the higher hydrostatic pressure lower down the duct section would reduce the flow rate at lower gas feed apertures, which could contribute to uneven flow.

The total volume feed rate of the gas to the duct section may be determined by the person skilled in the art in order to obtain a satisfactory, even flow rate of the water having suspended solid within the duct section.

The volume flow rate may be balanced with the number of gas feed apertures. Preferably, the gas feed apertures are positioned at constant separations so that there is an even distribution of gas throughout the water. For example, the gas feed apertures may be spaced apart from one another by a distance in the range 1 cm-20 cm and more preferably 5 cm-10 cm. It is preferred that the bubbles of gas formed in the water are relatively small, having a diameter up to and approximately 1 cm, to minimise turbulence created by the bubbles.

The pressure of the gas in the gas feed is suitably in the range $100\times10^3$ to $1500\times10^3$ Pa (15-225 psi) gauge, more preferably $300\times10^3$ Pa to $1000\times10^3$ Pa gauge (45-150 psi gauge), most preferably $600\times10^3$ Pa to $800\times10^3$ Pa (90-120 psi) gauge. Gas feed rate is suitably 0.02-0.1 $m^3$ per duct, most preferably 0.08-0.1 $m^3$ which is equivalent to 11-15 cubic feet per minute for four ducts.

Where there are a plurality of gas feed conduits, each may be supplied with a separate pressure control. This can assist with regulating the gas flow rate to ensure even flow rates throughout the duct. Preferably, each pressure control is operable independently on the others.

In operation, if a duct section becomes clogged, the gas flow rate can be locally increased to purge the relevant section.

The flow rate of water through the duct will depend upon conditions of use, but can be suitably in the range 2 $m^3$ per minute to 10 $m^3$ per minute, more suitably around 8 $m^3$ per minute-12 $m^3$ per minute (about 2000-3000 US gallons per minute). This flow rate of water is suitably used in conjunction with the flow rates of gas referred to above.

The duct of the present invention is suitable for use in dewatering of flocculated slurry. In such a method, flocculant is suitably added to the slurry at the rate of 1-10 kg per ton of solid material in the slurry, preferably around 2.3-3.2 kg (5-7 lb) per ton of solid in the slurry. Preferably, the slurry comprises from nearly zero to up to 25 percent solids by volume.

The duct of the present invention may be used in the apparatus of Hodges PCT '628, the content of which is incorporated herein by reference for any purpose.

The apparatus of the third aspect of the present invention can be used in the method and apparatus of Hodges '174. It may be used after the apparatus of Hodges PCT '628 to remove capillary water from the flocculated solids separated by the tracking screens from the slurry.

The vessel of the third aspect of the invention may be any suitable shape. The vessel may have an open top. The side walls and the base of the vessel are preferably airtight and water tight, to prevent leakage of solids and to allow the pressure in the second section to be reduced.

In a particularly preferred embodiment, the vessel comprises a water borne vessel, such as a barge. As the slurry will in many cases be obtained from a body of water, for example a lake, there will be a convenient place to hold the barge. By its nature, a water borne vessel is watertight.

The vessel may be formed of any suitable material, for example, metal or synthetic material such as composite material, for example glass reinforced plastic. A conventional steel vessel is particularly preferred because it is cheap and easy to manufacture.

The first section and second section may be located in any configuration with respect to one another, provided that water from the first section can flow through the filter screen to the second section. The first and second sections may be placed next to one another. However, it is particularly preferred that the first section lies above the second section in use, to provide the additional effect of gravity removal of water.

The first section and second section are separated from one another by a structure which preferably includes the filter screen. Preferably, the filter screen represents a large proportion of the area separating the first section and second section, to provide a large filtering surface area. Preferably, it represents at least 50% of the area of the structure, more preferably in excess of 75% and preferably 90-100%.

The filter screen must be capable of allowing water to pass through but retaining a substantial proportion of solids. The pore size of the filter screen will depend upon the nature of the flocculated solids being treated.

The porosity (the percentage of the area represented by pores) is preferably high to allow a high transfer of moisture.

In a preferred embodiment, the filter medium comprises a woven or non-woven thermoplastic geotextile, of the type known for use in reinforcement of ground, in the manufacture of road bases etc, for example a rubber woven geotextile.

The filter medium may comprise fibre glass, or a layer of material such as woodchips or sand. Where such filter media, which do not form a cohesive structure, are used, there may be a filter support medium for supporting the filter media.

A solid filter medium is preferred, as the dewatered solid can be removed therefrom easily, allowing it to be reused. Non-structural media have to be removed with the dewatered solid and disposed of at the same time.

The filter screen is preferably supported by a support frame. The support frame may be formed of any suitable material, for example steel. It may be in any suitable form, for example a grid or similar structure.

Preferably, the second section is of height in the range 100-400 mm, preferably 200-300 mm to act as a water-collecting zone.

The pump assembly may comprise a single pump which simultaneously removes water and reduces the pressure in the second section with respect to the first section. However, it has been found preferable to provide a pump assembly comprising a water pump, for pumping water from a lower part of the second section and an air pump for reducing the pressure below the first section, the air pump being connected to an upper part of the second section.

A sensor may be provided for determining the water level in the second section. If the water level falls below a predetermined level, the detector may be configured to switch off the water pump. The detector may determine if the water level rises above a second predetermined level, the detector being configured to switch off the air pump if the water level exceeds this level. The detector may comprise a flapper valve and float.

In the method of the third aspect of the invention, solids filtered from slurry in a separate filtration process are fed into the first section so that they spread over the filter screen until a complete layer is formed. This complete layer will naturally seal the second section, allowing the pressure therein to be reduced.

It has been found that the solids separated from slurry by filtration are thixotropic by nature. Accordingly, when they form the layer on the filter screen, they become effectively solid, forming a good seal.

Once the pressure is reduced, capillary water within the mass of solid drains at a high rate.

Without wishing to be bound by theory, it is understood that this is due to the Bernoulli effect, whereby the reduction in pressure is related to an acceleration of the flow speed of the water in the pores in the mass of solid.

Once the water level has reached a predetermined level in the second section, the pump assembly or water pump is switched on to remove the water. Under steady conditions, a continuous supply of solids removed from the slurry is fed into the first section whilst the water pump removes water from the second section and the air pump or pump assembly maintains the pressure in the second section below that of the first section.

This can continue until the first section can contain no more dewatered solids.

At this stage, supply of filtered solids is stopped. Dewatering by the pump assembly or air pump and water pump may continue until a sufficient quantity of water has been removed. Dewatered solid can be removed from the first section by any suitable means, for example by mechanical means such as a scoop or shovel.

Preferably, the first section is configured so that the solids can build up to a depth in excess of 0.5 m, more preferably in the range 0.5 m-1.5 m, most preferably around 1 m.

The filter medium may need periodic cleaning to remove broken or degraded floccules which block the pores. The cleaning may be undertaken using a high-pressure hose.

Preferably, the water pump or pump assembly can operate at a rate up to around 100 gallons per minute or more.

The solids filtered from the slurry may have a water content in the range 20-60% by weight, preferably 20-40% by weight before the dewatering step of the third aspect of the invention.

A plurality of vessels may be provided, one of which may be filled up while another is unloaded or cleaned.

BRIEF DESCRIPTION OF THE DRAWINGS

The embodiments of the present invention will be better understood when reference is made to the accompanying drawings, wherein identical parts are identified by identical reference numerals, and wherein:

FIG. 3 is a schematic cross sectional view through a duct according to the second aspect of the present invention;

FIG. 4 is a schematic cross sectional view taken along line IV-IV of FIG. 3;

DETAILED DESCRIPTION OF A PREFERRED EMBODIMENT

Figure 1:
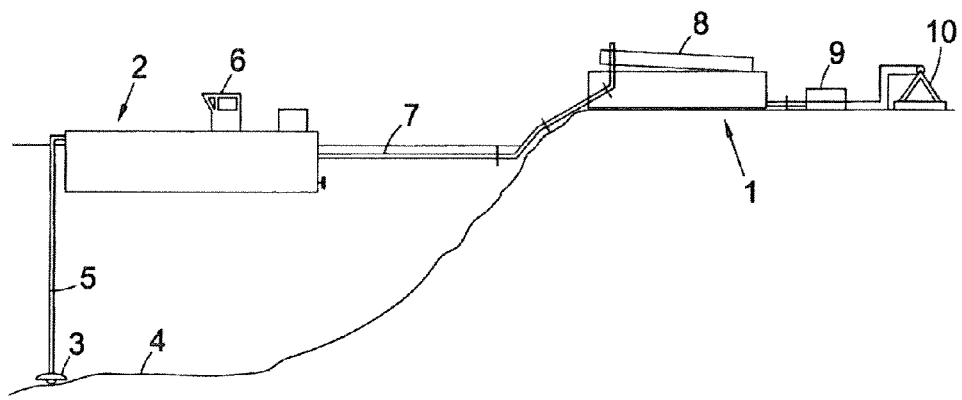
FIG. 1 is a schematic view of an apparatus for de-watering a stream of slurry.

FIG. 1 shows a schematic view of an apparatus 1 for dewatering a stream of slurry, according to the present invention. The apparatus can be used in the method of Hodges '174 or Hodges PCT '628. The apparatus corresponds to a generic slurry dewatering system, comprising a separator for the first stage according to the first aspect of the present invention.

A dredge assembly 2 is provided, which can include a cutting head 3 for dislodging sediment 4, a suction line 5 for removal of the dislodged settlements and a barge sub-assembly. The barge sub-assembly includes a motor, a drive train, lift pumps (not shown) and a pilot house 6. The dredge assembly 2 can be an hydraulic dredge as shown in FIG. 1 or a dipper or elevator dredge.

A slurry pipe line 7 is provided for transporting dredged slurry to the apparatus 1 for dewatering the slurry.

The apparatus 1 comprises a first separator 8 for receiving the stream of slurry and for separating objects above a first size. Typically, the first separator 8 will remove large objects, for example shells, rocks, plastic shopping bags, metal pieces, batteries, woodchips, pieces of wire and fishing line, vegetation, delaminated carpet and artificial grass etc.

The first separator 8 suitably comprises a screening device made by Action Equipment Company in Newburg Oreg., USA, sold under the trade mark VIBRA-SNAP.

Suitably it is as described in PCT published application WO2005/123278 or one of two United States published applications US2005/0274652 and US2005/0274653.

The screening device is combined with a tank, as will be further described with reference to FIG. 2 below. Primary treated slurry is collected in the tank and delivered by a pipe line and a pump (not shown) to a sand separator 9 for removing sand. A suitable design of sand separator can be obtained from the company McLanahan Corporation under the name LPT Integrated Sand Processing System.

The second separator 9 receives the stream of primary treated slurry and removes the sand from it to produce a stream of secondary treated slurry. The sand particles are, of course, of a size smaller than the large particles removed by the first separator 8.

The secondary treated slurry is collected and fed optionally by a further pump (not shown) to a third separator 10). The third separator 10 may be substantially as described in WO01/85628. Preferably, it comprises a duct as described above in relation to FIGS. 3 to 6 or 7.

Figure 2:
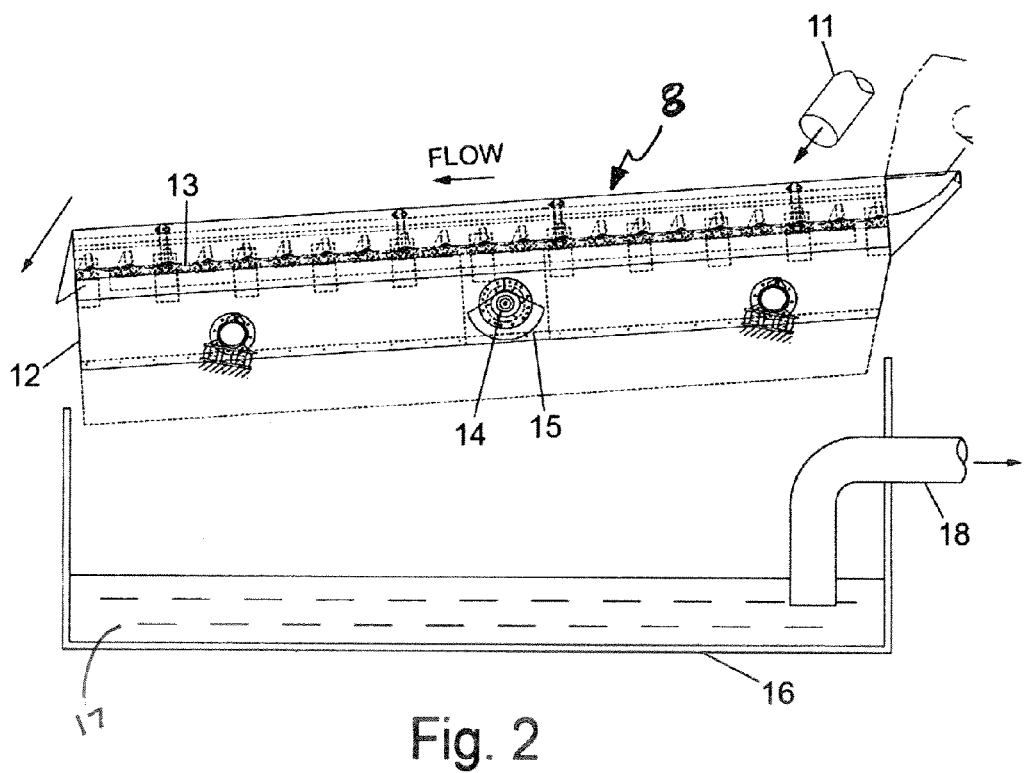
FIG. 2 is a schematic view of a first separator according to a first aspect of the present invention.

The first separator 8 is shown in more detail in FIG. 2. It comprises a screening device 12 as described above, mounted above a collector in the form of a tank 16. The screening device 12 is substantially as described in US2005/0274652 and will not be described further below. However, it can be seen that it comprises a frame assembly comprised of a main support frame section and a movable support frame section movably mounted on the main support frame section. There are a plurality of sieve mat supports spaced transversely along the length of the frame assembly. A flexible sieve mat 13 extends along a length of the frame assembly and is connected to and supported by the sieve mat support. The sieve mat supports are alternately connected to the main support frame section and the movable support frame section. An agitator in the form of a shaft 14 comprises an eccentrically mounted weight 15 is provided. Preferably, a 50-hz motor is provided (not shown) for rotating the shaft 14 and eccentrically mounted weight 15 at a suitable low frequency rate of rotation. The eccentrically mounted weight 15 is connected to the movable support frame section so that the latter is driven with a low frequency oscillation. As a result, the flexible mat 13 is driven a vigorous throwing or snapping motion to continuously animate the flexible screen.

It can be seen that the flexible mat 13 is mounted so that it is at an angle to the horizontal.

The flexible screen comprises screen openings which will permit water and objects below a certain size to pass through, so that a stream of primary treated slurry can be collected.

Slurry from the dredge is fed in through the pipe 11 at the highest end of the screen 12 while the screen is driven in vibrating motion. As a result, slurry with entrained objects flows steadily towards the left hand end. Liquid and objects having a size below the size of the openings of the flexible mat 13 fall through the mat and are collected in a tank 16. Objects above the size of the openings are retained on the top of the flexible mat. Due to the vigorous oscillating and snapping motion, they are continuously agitated to prevent the openings of the flexible mat becoming blocked. The combined effect of flow, agitation and gravity feeds the solid objects toward the left hand end where they are tipped over the end of the screen and collected for separate disposal.

Primary treated slurry 17 collected in the tank 16 can be pumped by a pump (not shown) and pipe 18 to the sand separator 9 as described above.

FIG. 3 shows a duct 19 according to the invention. It comprises a first duct portion 20 comprising a section of circular pipe. The section of circular pipe is connected to a vertically orientated fan shaped second duct portion 21. The first duct portion 20 defines a flow direction and a maximum width normal to the flow direction a. It can be seen that, at the top of the second duct portion 21, the width normal to the flow direction (indicated by the arrow) is A, which is much greater than the width a. In this way, the duct portion can spread out the flow of water having solid suspended therein so that flow can be fed to a tracking screen (not shown) for filtration of the suspended solids from the water, for example as shown in Hodges PCT '628.

The first duct portion 20 defines the inlet portion. The inlet portion leads directly to a base portion 22 which is of approximately rectangular prismatic shape and which is connected to a diverging section 23. At the point where the diverging section 23 joins the base section 22, the flow cross section is generally rectangular in plan, having a first aspect ratio. The aspect ratio of the flow cross section of the diverging duct 23 increases from top to bottom. The diverging section is defined by diverging walls 24 which are short when seen in a direction normal to the flow direction and converging walls 25 which, when seen in a direction normal to the flow direction are longer than the diverging walls 24. The degree of divergence of the walls 24 is balanced to the degree of convergence of the walls 25 so that the flow cross sectional area remains constant from top to bottom of the diverging section 24 but the aspect ratio increases. At the top of the duct 19, there is a top section. The top section comprises a rectangular prismatic body defining a flow cross sectional area which is substantially the same as the base portion 22 but which has a very much higher aspect ratio. The top portion includes two linearly extending edges defining a rim 26 over which the water may flow. There is a pair of upstanding end risers 27. Contiguous with the sides of the top portion a pair of flanges 28 are provided, extending parallel to the rim 26. The flanges 28 each provide a weir plate of generally v-section, mounted about 3 inches (7.6 cm) below the rim 8. The flanges 28 extend downwardly for a distance of approximately 4 inches (10.2 cm). The flanges 28 are provided to support tracking screens (not shown) as described in Hodges PCT '628. The duct is open to the air at the uppermost portion 11. The flanges 28 define an angle of from about 30° to about 60° from the horizontal. In a preferred embodiment, this angle matches that of the tracking screen (not shown) and it is generally from about 40° to 55°, most preferably from about 45° to about 50°.

The duct 19 is preferably constructed of sheet metal, and, particularly preferably, 10-gauge sheet metal, having a thickness of about 0.05 mm. The first duct section 22 comprises a pipe preferably constructed of carbon steel (SCH. 40) with a preferred diameter of about 10 inches (25.4 cm). The flanges 28 are preferably constructed of the same 10-gauge sheet material as the duct 19.

An air feed is provided. The air feed comprises a pump 30, a regulating valve 31 and an air feed conduit 32 on the left hand side. There is also an air feed conduit 33 on the right hand side which may be connected to a further pump and regulating valve 35 or, via an air main, to the pump 30. Each air conduit 32, 33 comprises a plurality of air feed apertures 34 at selected points.

The air feed conduits 32 and 33 preferably comprise 1 inch (25.4 mm) diameter PVC pipe and will be described further below.

In use, the water having solids suspended solids therein, for example flocculated slurry produced by the method of Hodges '174 or Hodges PCT '628 is fed into the first duct portion 20 and then flows upwards through the duct portion 21 as shown by the arrows until it reaches the rim 26 whereupon it flows over the rim in an evenly distributed flow for passing over tracking screens (not shown). While the water is being fed up through the duct portion 21, air is pumped by the pump 30 through the conduits 32 and 33 so that it is fed through the air feed apertures 34 as a mass of fine bubbles. This has a number of effects. In the first place, the average density of the water in the duct portion 22 is reduced, so that the weight of the water column and the hydrostatic pressure is reduced. The volume flow rate of the water can be controlled without increasing the mass flow rate.

At the top, the air bubbles break the surface in a simple fashion and do not interfere with the flow of the water over the tracking screens. If any flocculated solids start to deposit, they will be purged by the flow of bubbles.

The air flow rate can be controlled using the pump 30, or the valves 31 and 35 (or all of them) to obtain exactly the right mass flow of rate of water and volume flow rate through the duct so that good flow over the tracking screens can be obtained whilst allowing optimum flow speeds to be maintained in the duct to prevent deposition of flocculated material.

Figure 6:
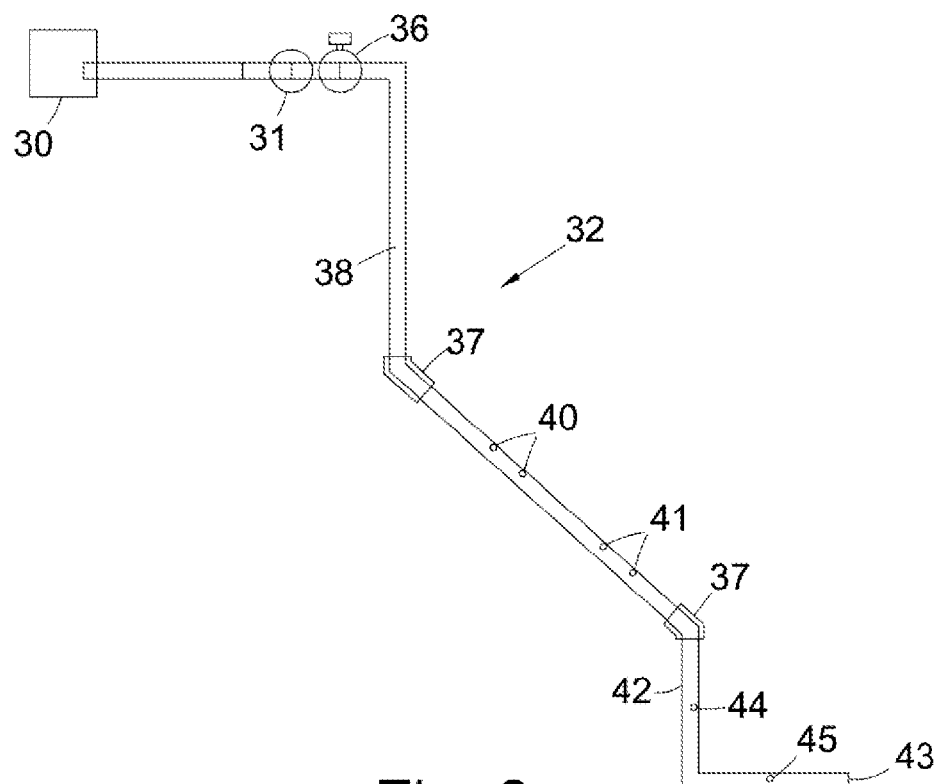
FIG. 6 is an illustration, at larger scale, of a gas feed conduit for use in the FIG. 3 duct.

FIG. 6 shows the air conduit 32 in more detail. The pressure regulator valve 31 can be used to control the pressure in the conduit in the range from 0 to 150 psi ($0.1 \times 10^6$ Pa) gauge. A shut off valve 36 may additionally be provided. The conduit 32 comprises a plurality of 1-inch (25.4 mm) internal diameter PVC sections joined together by 135-degree elbow joints 37. The first conduit section 38 is of length 24 inches (61 cm) and does not have any air apertures formed therein. The second conduit section 39 is of length 60 inches (152 cm) and comprises in sequence, two air apertures 40 of ⅛ inch diameter (3.2 mm) followed by two further air apertures 41 of 3/16 inch diameter (4.8 mm) spaced apart from one another and from the adjacent elbow joint 37 by 10 inches (25.4 cm). The final conduit section 42 comprises a first leg of 16 inches length (40.6 cm) and a second leg of 13 inches (33 cm) in length with a plug 43 in the end to prevent escape of gas from the end. There is a first air aperture 44 of ¼ inch diameter (6.4 mm) spaced 5.5 inches (14 cm) from the right angle bend and a second air aperture 45 of 1¼ inch (6.4 mm) diameter spaced 4 inches (10.2 cm) from the right angle bend.

It can be seen that the diameter of the air apertures increases in steps in the direction down the duct portion 21. This is because hydrostatic pressure increases down the duct in use and a larger aperture is required in order to ensure that approximately the same quantity of air is fed through the apertures further down as through the apertures which are further up, to ensure an even distribution of bubbles.

Preferably, four ducts as shown in the FIGS. 3-6 are arranged with their long edges 268 parallel to one another and in line, all four ducts being supplied with compressed air by a single pump.

The four ducts are configured to carry, together, from 8 m³ per minute-12 m³ per minute (2000-3000 US gallons per minute) of flocculated slurry having from nearly zero to 25 percent solids by volume. Air is supplied at $600 \times 10^3$ Pa to $800 \times 10^3$ Pa (90-120 psi) and at a flow rate of 0.31-0.43 m³ (11-15 cubic feet) per minute distributed equally between the four ducts.

Flocculant is added to the slurry at the rate of around 2.3-3.2 kg (5-7 lb) per ton of solid in the slurry. Preferably, the slurry comprises from nearly zero to up to 25 percent solids by volume. The air flow rate can be adjusted within the above range to provide an excellent, even flow of slurry without precipitation of flocculated solids in the duct.

Figure 5:
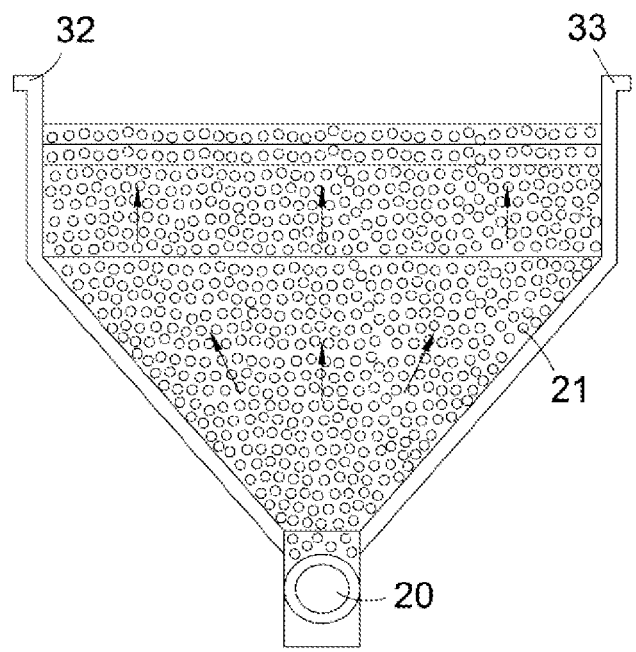
FIG. 5 is a schematic cross sectional view of the FIG. 3 duct, in use.

FIG. 5 is a schematic cross sectional view of the duct 19, in use, showing the even generation of air bubbles throughout the volume of water in the duct portion 21.

Figure 7:
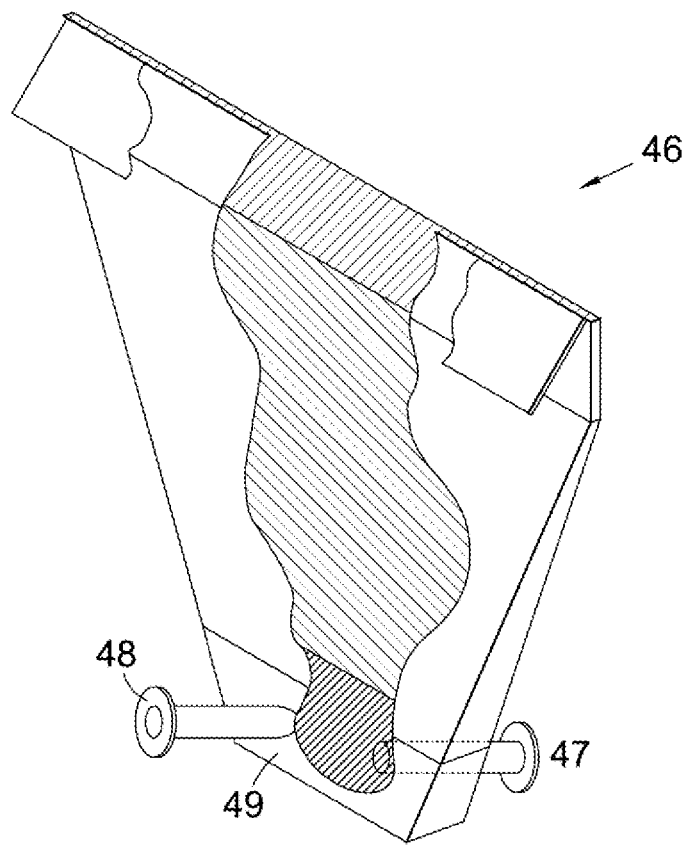
FIG. 7 is a schematic isometric view of a second embodiment of a duct according to the second aspect of the invention.

FIG. 7 is an isometric view of a second embodiment of duct 46 according to the present invention. It is substantially the same as the duct 19 described above and will not be described further except that, instead of there being a single connection to an inlet 20, there are two connections 47, 48 which engage the inlet portion 49 from opposite sides, at position displaced from one another. This will result in streams from the connections 47 and 48 interacting in the inlet portion 49 to create a vortex which has the effect of increasing the time that the flocculating agent has to act on the water, without introducing excessive shear and further improves the flow characteristics in the duct 46. The duct 46 will contain a gas supply as described in relation to figure, but it is omitted from FIG. 7, for clarity.

Figure 8:
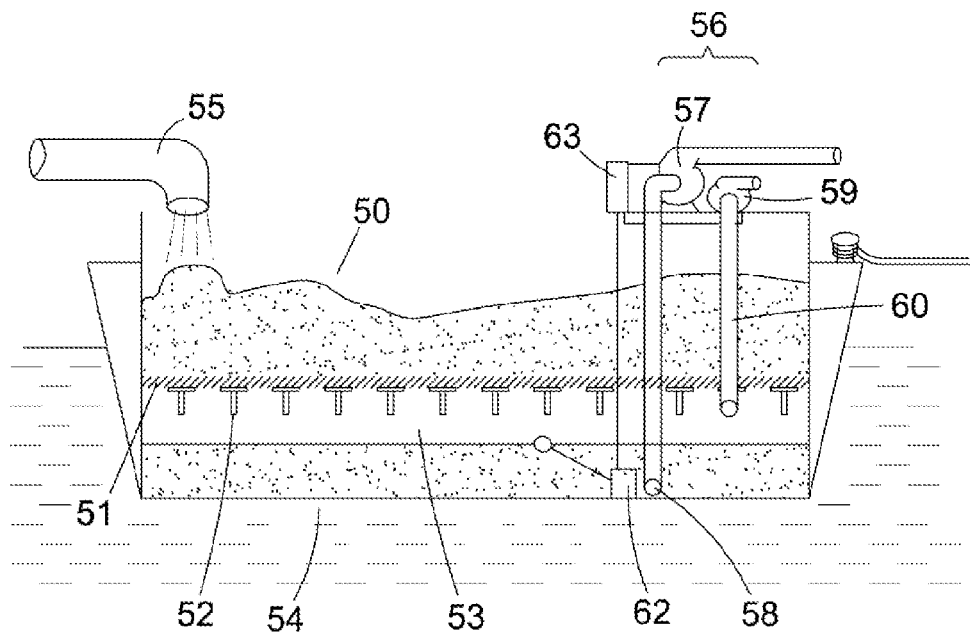
FIG. 8 is a schematic cross section through a first embodiment of an apparatus according to the third aspect of the invention.

FIG. 8 shows a schematic cross sectional view through an apparatus for removing water from solids which have been separated from slurry, according to the third aspect of the invention.

The apparatus comprises a vessel in the form of a steel barge. It is shown moored, for example, in a lake.

The barge comprises a first section 50, defined by side walls and open to the top. The bottom of the first section is defined by a filter screen 51 comprising a rubber woven geotextile material. The filter screen 51 is supported on a structure 52. The structure 52 is shown as a grid of cross bars supported by frames, but can be any suitable structure for supporting the weight of the solid and the filter screen.

The filter screen defines the top surface of a second section 53 which is further defined by the walls and by the bottom plate 54 of the vessel 49.

A supply 55 of solid removed from slurry is shown. The solid is removed from slurry, for example using the apparatus described herein or as described in Hodges '174 or Hodges PCT '628.

A pump assembly 56 is provided, comprising a water pump 57 which draws via a tube 58 which extends down to the bottom of the second section, for removing water therefrom. A second pump 59 is provided which draws via a second pipe 66 from a top part of the second section for removing air therefrom and for reducing the pressure in the second section with respect to the first section.

Water pumped by pump 57 can be delivered at 60 for further treatment, for disposal or any suitable further action.

A float sensor 62 is provided for sensing the level of water in the second section. If it is too low, a signal is sent to a controller 63 which switches off the first pump 67. If it is too high, a signal is sent to the controller 63 which switches off the second pump 59.

In use, filtered solids are fed via the duct 55 so that they form a complete layer on the filter medium 51. Being of a thixotropic nature, the solid forms a rigid layer which does not allow air to pass therethrough. At this stage, the second pump 59 is switched on to reduce the pressure in the second section. As a result, the flow of water from the solid mass through the filter medium 51 is accelerated and water collects in the bottom of the second section 53.

Once it has reached a level which is safe to pump from, the first pump 57 is switched on and the water is pumped away at 61 for further disposal.

The process continues, as a layer of dewatered solids builds up on the filter medium 51. If the water level in the second section is too high, the action of the second pump 59 is temporarily interrupted while the first pump removes the excess water. If the water level falls too low, the first pump is interrupted while the water builds up again. The process continues until the solids in the first section 50 have built up to a predetermined level. At this point, supply of filtered solids at 55 is interrupted and dewatering continues until the level of moisture in the layer of solids has reached a desired level. At this stage, the barge can be taken for removal of the dewatered solids.

A second barge may be provided, to which the flow of filtered solids at 55 can be directed whilst the first barge is being unloaded.

Figure 9:
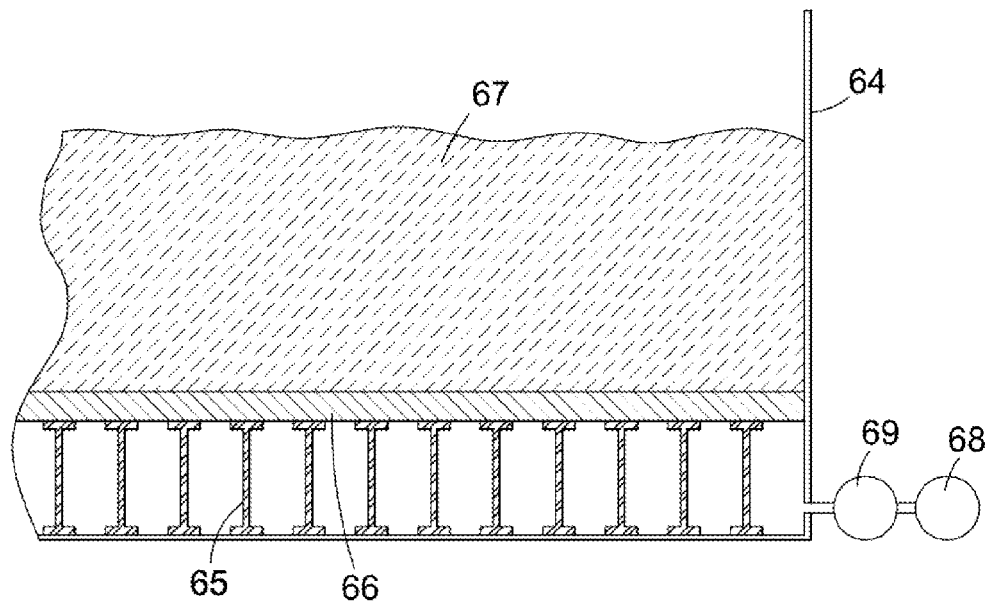
FIG. 9 is a schematic cross section through a second embodiment of an apparatus according to the third aspect of the invention.

FIG. 9 is a partial cross sectional view through a second embodiment of an apparatus for removing water from solids according to the third aspect of the invention. Many aspects of this embodiment are similar to those shown in FIG. 8 and are not described. However, it can be seen that the vessel 64 comprises a support structure 65 comprising a plurality of I beam sections, supporting a filter membrane 66 in the form of a geo textile grid. A layer of sediment 67 is built up on top of the grid 66 and dewatered by the operation of a water pump 68 and an air pump 69 acting jointly on the space below the grid. A sensor (not shown) is provided for detecting if the water level in the base of the vessel 64 drops below a certain level, to protect the pump 68.

The present invention has been described above purely by way of example and modifications can be made within the invention, which extends to equivalents of the features described. The invention also consists in any individual features described or implicit herein as shown or implicit in the drawings or any combination of any such features or any generalisation of any such features or combination.

The invention claimed is:

1. A duct for use in an apparatus for separating suspended solids from a liquid, the duct comprising:
    an inlet for receiving an input flow of slurry comprising the suspended solids suspended in the liquid;
    an inlet portion for receiving the input flow of slurry from the inlet to produce an internal flow of slurry;
    an outlet portion for receiving the internal flow of slurry from the inlet portion to produce an output flow of slurry, wherein the maximum width of the outlet portion is greater than the maximum width of the inlet portion, both maximum widths determined in a direction normal to the internal flow of slurry;
    a duct section that connects the inlet and outlet portions, wherein the duct section comprises:
    an upper portion having a length to width aspect ratio of at least 40:1 in a plane normal to the internal flow of slurry; and
    at least one gas feed configured to introduce gas into the internal flow of slurry, wherein:
        the at least one gas feed comprises a gas-feed conduit having a plurality of apertures, wherein at least the plurality of apertures and a portion of the gas feed conduit are located in the duct section,
        the gas-feed conduit is connected to a gas-pressure control configured to increase a gas flow rate in order to purge the duct section of previously suspended solids that settle in the duct section, and
        the at least one gas feed is configured to produce gas bubbles that break the surface at the outlet portion resulting in the output flow of slurry comprising the suspended solids suspended in the liquid.

2. The duct of claim 1, wherein:
    the plurality of gas feed apertures are located within the duct section at different distances from the inlet portion, the size of the apertures decreasing with increasing distance from the inlet portion.

3. The duct of claim 1, wherein:
    the gas conduit extends along at least part of the duct section.

4. The duct of claim 1, wherein:
    the at least one gas feed is a plurality of gas feeds located at different positions in the duct section.

5. An apparatus for de-watering a stream of slurry, comprising:
- a first separator for separating objects larger than a first size from the stream, producing a stream of primary treated slurry, the first separator comprising:
  - a frame assembly with a main support frame section and a movable support frame section, the movable support frame section movably mounted on the main support frame section;
  - a plurality of sieve mat supports spaced transversely along a length of the frame assembly;
  - a sieve mat, comprising a flexible material, extending along the length of the frame assembly and connected to and supported by the plurality of sieve mat supports, the sieve mat supports being alternately connected to the main support frame section and the movable support frame section, and
  - a collector located below the sieve mat for collecting primary treated slurry passing through the sieve mat;
- a second separator, in communication with the first separator to receive the primary treated slurry, for separating objects larger than a second size therefrom, the second size being smaller than the first size, to produce a stream of secondary treated slurry; and
- a third separator, in communication with the second separator to receive the secondary treated slurry, for separating objects larger than a third size therefrom, the third size being smaller than the second size, to produce a stream of tertiary treated slurry, the third separator comprising a duct according to claim 1.

6. The apparatus of claim 5, further comprising:
an eccentric drive mechanism connected to the main frame support for applying a drive force thereto.

7. The apparatus of claim 5, further comprising:
an agitator, arranged to animate the flexible material of the sieve mat.

8. The apparatus of claim 5, wherein:
the sieve mat has upwardly curved lateral sides.

9. The apparatus of claim 8, wherein:
the upwardly curved lateral sides provide a non-vertical, gradually curved shape to the sieve mat.

10. The apparatus of claim 5, wherein:
the sieve mat is disposed at a declined orientation.

11. The apparatus of claim 5, wherein:
the collector comprises a tank.

12. A method of feeding water having solids suspended therein for use in a method for separating the solid from the water, the method comprising the steps of:
feeding water having solid suspended therein into the duct described in claim 1, wherein a gas is fed into the flow of water having solid suspended therein via the plurality of apertures.

13. A method of dewatering a stream of slurry, comprising the steps of:
passing the stream of slurry through a first separator to separate solids larger than a first size from the stream, producing separated solids and a stream of primary treated slurry;
passing the stream of primary-treated slurry through a second separator to separate solids larger than a second size, smaller than the first size, from the stream of primary treated slurry, producing separated solids and a stream of secondary-treated slurry; and
passing the stream of secondary treated slurry through the duct of claim 1 to separate solids larger than a third size, smaller than the second size, from the stream of secondary treated slurry, producing separated solids and a stream of tertiary-treated slurry;
wherein the first separator comprises:
a frame assembly having a main support frame section and a movable support frame section movably mounted on the main support frame section;
a plurality of sieve mat supports spaced transversely along the length of the frame assembly;
a flexible sieve mat extending along the length of the frame assembly, the sieve mat connected to and supported by the sieve mat supports, the sieve mat supports being alternately connected to the main support frame section and the movable support frame section, such that continuously agitating the movable support frame section imparts motion to parts of the flexible sieve mat connected to the movable support frame section; and
a collector, below the flexible sieve mat, for receiving treated slurry passing therethrough.

14. The apparatus of claim 5, further comprising:
an apparatus for supplying the stream of slurry to the first separator, the apparatus comprising:
a water-borne vessel with first and second sections, the first section positioned above the second section, with a filter screen separating the respective sections, the filter screen selected to retain in the first section a portion of the solids contained in a slurry and to allow the water and remaining solids to pass therethrough as a treated slurry; and
a pump assembly, an inlet thereof connected to the second section to reduce the pressure in the second section relative to the first section, and an outlet thereof communicated to the first separator for transferring the treated slurry thereto.

15. The duct of claim 1, further comprising:
a second gas feed for introducing gas into the input flow of slurry at the inlet portion.

16. The duct of claim 1, wherein:
the at least one gas feed is configured such that the gas introduced into the internal flow of slurry reduces the average density of the internal flow of slurry in the duct portion.

17. The duct of claim 1, wherein the duct section further comprises a base portion having a length to width aspect ratio from 1:1 to 4:1 in a plane normal to the internal flow of slurry.

18. The duct of claim 1, wherein the upper portion has a length to width aspect ratio between 40:1 and 100:1 in a plane normal to the internal flow of slurry.

19. The duct of claim 1, wherein:
the duct section comprises at least two opposed diverging wall sections characterized by a reduction in hydrostatic pressure as distance from the inlet portion is increased, and
the plurality of gas feed apertures are located along the diverging wall sections of the duct section, the plurality of gas feed apertures configured to provide a gas feed rate that is substantially equal.

20. The duct of claim 1, wherein:
the duct section includes two opposed diverging wall sections;
the at least one gas feed comprises at least two gas-feed conduits,
a first gas-feed conduit having a first set of apertures along one of the two opposed diverging wall sections, and
a second gas-feed conduit having a second set of apertures along the other of the two opposed diverging wall sections, wherein,
each of the at least two gas-feed conduits is connected to an independently controllable gas-pressure control;
each of the gas-pressure controls is configured to increase the gas flow rate through the corresponding gas-feed conduit in order to purge the duct section of the previously suspended solids that settle in the duct section.

21. The duct of claim 1, wherein the at least one gas feed conduit is configured to produce gas bubbles having a diameter of approximately 1 cm.

22. The duct of claim 1, wherein the gas feed comprises:
a pressure regulator valve to control the pressure of the gas in the gas-feed conduit.

\* \* \* \* \*